United States Patent [19]
Amos et al.

[11] Patent Number: 5,922,793
[45] Date of Patent: Jul. 13, 1999

[54] MODIFYING AGENTS FOR POLYOLEFINS

[75] Inventors: Stephen E. Amos, Minneapolis, Minn.; Markus A. Wicki, London; Kent E. Nielsen, Dorchester, both of Canada

[73] Assignee: Minnesota Mining and Manufacturing Company, St. Paul, Minn.

[21] Appl. No.: 08/773,703

[22] Filed: Dec. 27, 1996

[51] Int. Cl.$^6$ .................................................. C08J 5/42
[52] U.S. Cl. ........................................ 524/159; 524/160
[58] Field of Search ..................................... 524/159, 160

[56] References Cited

U.S. PATENT DOCUMENTS

| | | | |
|---|---|---|---|
| 3,367,926 | 2/1968 | Voeks | 260/93.5 |
| 3,933,779 | 1/1976 | Baron et al. | 524/159 |
| 4,829,114 | 5/1989 | Trotoir et al. | 524/243 |
| 5,013,778 | 5/1991 | Bath | 524/173 |
| 5,135,975 | 8/1992 | Rekers | 524/108 |
| 5,342,868 | 8/1994 | Kimura et al. | 524/108 |
| 5,491,187 | 2/1996 | Ward et al. | 524/159 |

FOREIGN PATENT DOCUMENTS

| | | | |
|---|---|---|---|
| 0 267 695 | 5/1988 | European Pat. Off. | C08K 5/00 |
| 2 075 549 | 9/1971 | France | C08F 45/00 |
| 2 656 820 | 7/1991 | France | C08L 23/02 |
| 1 544 851 | 5/1970 | Germany | C08F 29/02 |
| 1 694 914 | 3/1972 | Germany | C08F 29/02 |
| 57-18682 | 1/1982 | Japan . | |
| 58-160343 | 9/1983 | Japan | C08L 67/20 |
| 61-17834 | 5/1986 | Japan . | |
| 1-180514 | 7/1989 | Japan | G02C 7/02 |
| 7-173342 | 7/1995 | Japan | C08L 23/10 |
| 2 290 296 | 12/1995 | United Kingdom . | |

OTHER PUBLICATIONS

** Abstract in English Language.
Snider et al., "Mn(III)–Based Oxidative Free Radical Cyclization of Unsaturated Ketones," J. Org. Chem., 60, pp. 5376–5377, 1995.
Overman et al., "An Annual Publication of Satisfactory Methods for the Preparation of Organic Chemicals," Organic Syntheses, vol. 71, pp. 48–55, 1993.
Fillon et al., "Self–Nucleation and Recrystallization of Isotactic Polypropylene ($\alpha$ Phase) Investigated by Differential Scanning Calorimetry," Journal of Polymer Science: Part B: Polymer Physics, vol. 31, pp. 1383–1393, 1993.
Fillon et al., "Self–Nucleation and Enhanced Nucleation of Polymers. Definition of a Convenient Calorimetric "Efficiency Scale" and Evaluation of Nucleating Additives in Isotactic Polypropylene ($\alpha$ Phase)," Journal of Polymer Science: Part B: Polymer Physics, vol. 31, pp. 1395–1504, 1993.

*Primary Examiner*—Peter D. Mulcahy
*Attorney, Agent, or Firm*—Daniel C. Schulte

[57] ABSTRACT

Sulfonic acid salts of compounds of formula (I):

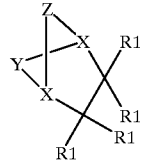

(I)

wherein X, Y, Z and R1 are as defined in the specification are useful as clarifying and/or nucleating agents for polyolefins.

28 Claims, No Drawings

MODIFYING AGENTS FOR POLYOLEFINS

FIELD OF THE INVENTION

The invention is directed to sulfonate modifying agents that can improve properties of compositions made from polyolefins such as polypropylene. These modifying agents improve the optical and physical properties of polymers and polymer blends to which they are added. The invention further relates to compositions that contain a polyolefin and a modifying agent as described herein, and to methods of improving the optical and physical properties of polyolefins using the modifying agent of the invention.

BACKGROUND OF THE INVENTION

Polyolefins, including polypropylene, are used in a variety of industrial applications. For some of these applications, such as packaging, storage containers, disposable medical devices, and so on, it is necessary or desirable that the product or article be optically clear. The optical and physical properties of the polyolefins are largely dependent upon the number of nucleation sites and the rate of nucleation during the crystallization process. The nucleation step of the overall crystallization process for polyolefins such as stabilized polypropylene is generally slow, so that a relatively small number of nucleation sites are formed. These nucleation sites are the points at which spherulites start to grow during the subsequent crystallization step. Because the number of sites is low, the spherulites can grow to a large size. When the size of the spherulites is larger than the wavelength of incident light, the light scatters and the polyolefin has a hazy appearance.

The size of the spherulites can be reduced and the optical properties of the polyolefin improved by the addition of nucleating and/or clarifying agents ("modifying agents") during processing. These agents increase the number of nucleation sites, and therefore the rate of nucleation. The size of the spherulites that form at these sites is smaller and the spherulites are more numerous as a result of this heterogeneous nucleation. If the spherulites are smaller in size than the wavelength of incident light, scattering of the light is substantially reduced and the resin appears clear.

Reduction of spherulite size also affects the physical properties of the polyolefin, e.g. flexural modulus, heat distortion temperature, impact strength and elongation at break of the resin can change with the addition of a modifying agent. The enhanced heterogeneous nucleation raises the crystallization onset temperature of the resin. This can result in a reduced cycle time during processing and greater manufacturing efficiency.

Nucleating and clarifying agents are generally known in the polymer art. U.S. Pat. No. 5,135,975 describes clarifying agents commercially known as the Millad™ group of products produced by Milliken Chemicals. These additives, particularly Millad™ 3988 have good organoleptic properties and resist plate-out, but dispersion problems resulting in the appearance of white specks have been encountered by some users. Relatively high process temperatures are needed to prevent the appearance of these white specks. Related clarifiers are described in JP 57-018682 and in JP 86-017834.

U.S. Pat. No. 5,342,868 describes the use of various organophosphorus salts as clarifiers for various crystalline synthetic resins. These additives perform well but their higher cost makes them somewhat less economical for use on a large scale.

There is a need in the art for agents that can be added to polyolefins such as polypropylene that are compatible with the polyolefin and stable under polyolefin processing conditions, that improve the optical and/or physical properties of the polyolefin, and that may be efficiently obtained or produced.

SUMMARY OF THE INVENTION

We have found that sulfonic acid salts of compounds of formula (I) are useful modifying agents for polyolefins, especially as nucleating and/or clarifying agents:

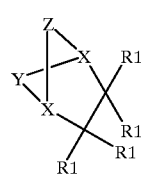

(I)

wherein each X is independently $NH^+$, $NH_2^+$, CH or $CH_2$;
Y is $C_{1-18}$ alkylene,
$C_{2-18}$ alkenylene,
$C_{3-18}$ cycloalkylene,
$C_{4-18}$ cycloalkenylene, or arylene;
Z is absent or is $C_{1-18}$ alkylene,
$C_{2-18}$ is alkenylene,
$C_{3-18}$ cycloalkylene,
$C_{4-18}$ cycloalkenylene, or arylene;
and
each R1 is independently -H,
$C_{1-18}$ alkyl, or
the R1 groups on the same carbon atom may combine to form an oxo group.

Accordingly, the invention provides compositions comprising a polyolefin and an effective nucleating and/or clarifying amount of a sulfonic acid salt of a compound of formula (I).

The invention further provides a method of enhancing the crystallinity of a polyolefin by adding an eff&ctive amount of a sulfonic acid salt of a compound of formula (I), or a salt thereof, to the polyolefin.

The sulfonic acid salts of compounds of formula (I) act as modifying agents, e.g. nucleating and/or clarifying agents, for polyolefins. A nucleating agent acts to improve the physical properties of the polyolefin such as strength, weatherability, solvent resistance, heat deflection temperature and so on by providing sites for crystal formation, resulting in formation of increased numbers of spherulites. If the spherulites are sufficiently large to scatter visible light, the polyolefin material will not be optically clear. A clarifying agent provides compositions that are more optically clear by causing the formation of spherulites that are sufficiently small that they scatter less visible light. Generally, the different physical properties of the polyolefin, such as the yield stress and impact resistance, tend to vary as the spherulites become smaller in size, so that the desired optical clarity and physical properties should be balanced when determining the type and amount of modifying agent to use.

DETAILED DESCRIPTION OF THE INVENTION

The modifying agents of the invention are sulfonic acid salts of compounds of formula (I):

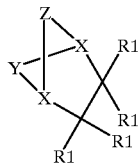
(I)

wherein each X is independently $NH^+$, $NH_2^+$, CH or $CH_2$;

Y is $C_{1-18}$ alkylene,
$C_{2-18}$ alkenylene,
$C_{3-18}$ cycloalkylene,
$C_{1-18}$ cycloalkenylene, or
$C_{3-18}$ arylene;

Z is absent or is $C_{1-18}$ alkylene,
$C_{2-18}$ alkenylene,
$C_{3-1}$ cycloalkylene,
$C_{4-18}$ cycloalkenylene, or
$C_{3-18}$ arylene;
and each R1 is independently -H or
$C_{1-18}$ alkyl, or
the R1 groups on the same carbon atom may combine to form an oxo group.

In the above formulas each alkyl, alkylene and alkenylene group can be straight or branched. For example, "$C_{1-18}$ alkyl" includes methyl, ethyl, n-propyl, i-propyl, n-butyl, s-butyl, i-butyl, t-butyl, and so on. The cycloalkylene, cycloalkenylene, and arylene groups include groups that are alkyl substituted, up to the specified number of carbon atoms.

"Arylene" includes carbocyclic and O, S, or N heterocyclic aryl, but is preferably carbocyclic aryl, most preferably phenyl.

Each ring in the compound has a maximum of 8 ring atoms.

Some compounds useful in the invention contain one or more chiral centers. In this instance, the invention includes each enantiomer or diastereomer as well as mixtures (e.g. racemic mixtures) of the enantiomers or diastereomers.

For fused ring systems, such as those wherein Y and/or Z are divalent cyclic groups, attachment at the 1 and 2 positions is generally preferred, although other types of fusion such as 1,1 and 1,3 are possible.

The sulfonic acids useful in the modifying agents of the invention may be any group of the formula $R\text{-}SO_3\text{-}H$, wherein R is any suitable aliphatic or aromatic group. Preferably R is selected from the group consisting of

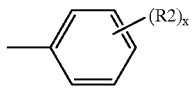

wherein each R2 is independently $C_{1-18}$ alkyl and x is 0–5;
$C_{1-18}$ alkyl;
$C_{1-18}$ fluoroalkyl; and

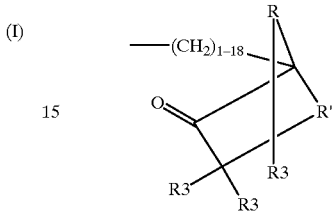

wherein R and R are independently
selected from $C_{1-8}$ alkylene, and
each R3 is independently -H or
$C_{1-18}$ alkyl.

The fluoroalkyl group can have one or more of the alkyl hydrogen atoms replaced by fluorine atoms, and includes perfluoroalkyl groups.

One preferred sulfonic acid has the formula:

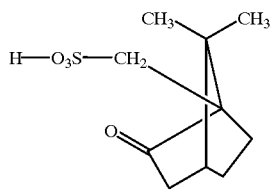

A preferred modifying agent is that of the following formula:

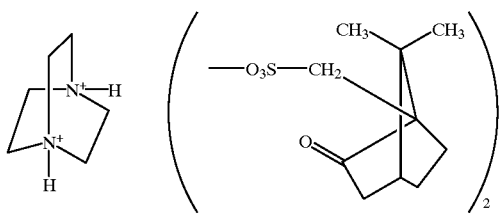

The modifying agent can be included in a composition of the present invention in an amount sufficient to provide desired optical and/or physical properties to the composition. Preferably, the modifying agent can be present in the composition in an amount in the range from about 0.001 to 1 wt-% based on the total composition weight, more preferably from about 0.15 to 0.7 wt-%.

The amines and sulfonic acids used to prepare the sulfonate modifying agents of the invention are known and commercially available. The salts can be prepared by combining the amine and sulfonic acid in an appropriate organic solvent.

The modifying agents of the invention can improve physical properties of polyolefins such as polypropylene, as well as polyolefin copolymers derived from monomers comprising at least one olefinic monomer. The polyolefins can generally have a melt flow rate of about 1 to 70, preferably about 7 to 35 g/10 min according to ASTM D-1238.

Polyolefins useful in the composition of the invention include polymers and copolymers derived from one or more olefinic monomer of the general formula $CH_2=CHR''$, wherein $R''$ is hydrogen or $C_{1-18}$ alkyl. Examples of such monomers include propylene, ethylene, and 1-butene, with propylene being generally preferred. Representative examples of polyolefins derived from such olefinic monomers include polyethylene, polypropylene, polybutene-1, poly(3-methylbutene), poly(4-methylpentene) and copolymers of ethylene with propylene, 1-butene, 1-hexene, 1-octene, 1-decene, 4-methyl-1-pentene, and 1-octadecene.

The polyolefin may optionally comprise a copolymer derived from an olefinic monomer and one or more further comonomers that are copolymerizable with the olefinic monomer. These comonomers can be present in the polyolefin in an amount in the range from about 1 to 10 wt-% based on the total weight of the polyolefin. Useful such comonomers include, for example, vinyl ester monomers such as vinyl acetate, vinyl propionate, vinyl butyrate, vinyl chloroacetate, vinyl chloropropionate; acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid such as dimethyl maleate, and diethyl maleate; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers, and N-vinyl pyrrolidine monomers.

The polyolefin may also contain a metallic salt form of a polyolefin, or a blend thereof which contains free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt.

Preferred polyolefins include polypropylene homopolymers and copolymers of propylene with ethylene, 1-butene, 1-hexene, 1-octene, 4-methyl-1-pentene, vinyl acetate, or methyl acrylate.

The polyolefins can also include blends of these polyolefins with other polyolefins or copolymers or blends thereof containing conventional adjuvants such as antioxidants, light stabilizers, acid neutralizers, fillers, antiblocking agents and pigments.

Representative blends of polyolefins useful in this invention include blends of polyethylene and polypropylene, low density polyethylene and high-density polyethylene, and polyethylene and olefin copolymers derived from an olefinic monomer and one or more of the above-described optional copolymerizable comonomers, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The modifying agent may be incorporated into a polyolefin using any method that does not cause substantial degradation or vaporization of the modifying agent. This can be accomplished using any mixture method that is convenient, such as a melt mixer, an extruder, and the like. The modifying agent may be dry blended with the polyolefin in flake, granule, or pellet form; a liquid melt, dispersion, suspension or solution of the modifying agent may be combined with the polyolefin in flake, granule, or pellet form; or a concentrated blend of the modifying agent in polyolefin may first be prepared and then blended with the polyolefin to obtain a final desired concentration of modifying agent. If such a concentrated blend is prepared the modifying agent can be present in the concentrated blend in an amount in the range from about 0.5 to 5 wt-%.

If desired, components may be added to the polyolefin in addition to the modifying agent. Examples of such components include pigments, antioxidants, acid neutralizers, antistatic agents, ultraviolet light absorbers, and hindered amine stabilizers.

The modifying agent can be added to the polyolefin at any time during processing of the polyolefin, so long as adequate dispersion of the modifying agent is obtained before the polyolefin begins to crystallize.

The polyolefin containing a desired amount of modifying agent can be formed into articles as desired in any manner known in the art. For example, the polymer can be injection molded, extruded, thermoformed, compression molded, and so on to form desired shapes and articles.

The invention is further described by reference to the following examples, which are understood to be illustrative and not limiting of the invention.

EXAMPLES

Preparative Examples

For each of the diamine adducts, a solution of the sulfonic acid (2 eq.) in EtOH (10 mL) was added to a solution of the corresponding diamine in EtOH (10 mL). The reaction mixture was stirred at room temperature for 30 min. The resulting solid was filtered, washed with EtOH, and dried.

Preparative Example 1

Preparation of 1,4-Diazoniabicyclo[2.2.2]octanedi-p-toluenesulfonate

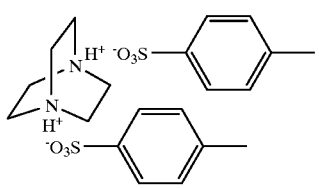

Following the above procedure, the reaction of diazobicyclo[2.2.2]octane (DABCO)(997 mg, 8,9 mmol) and p-toluenesulfonic acid $H_2O$ (3.39 g, 17.8 mmol) yielded the product as a colorless solid: 3.53 g (87%).

Preparative Example 2

Preparation of 1,4-Diazoniabicyclo[2.2.2]octane dimethanesulfonate

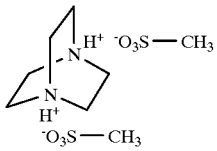

Following the above procedure, the reaction of DABCO (1.00 g, 8.9 mmol) and methanesulfonic acid (1.72 g, 17.8 mmol) yielded the product as a colorless solid: 1.54 g (57%).

Preparative Example 3

Preparation of 1,4-Diazoniabicyclo[2.2.2]octane di-(±)-10-camphorsulfonate

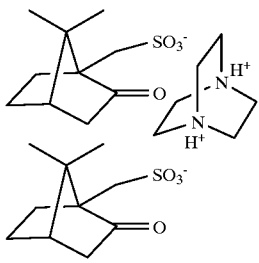

Following the above procedure, the reaction of DABCO (1.00 g, 8.9 mmol) and (±)-10-camphorsulfonic acid (4.14 g, 17.8 mmol) yielded the product as a colorless solid: 3.68 g (72%).

Preparative Example 4

Preparation of 1,4-Diazoniacyclohexane di-p-toluenesulfonate

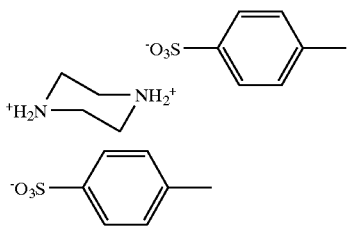

Following the above procedure, the reaction of piperazine (997 mg, 11.6 mmol) and p-toluenesulfonic acid H$_2$O (4.42 g, 23.2 mmol) yielded the product as a colorless solid: 4.63 g (93%).

Preparative Example 5

Preparation of 1-Azonia-3-oxo-bicyclo[2.2.2]octane p-toluenesulfonate

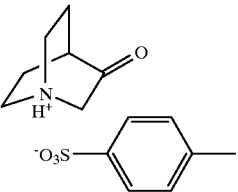

A solution of quinuclidin-3-one HCl (2.00 g, 12.4 mmol) in H$_2$O (20 mL) was treated with 10% NaOH until the pH reached 14. NaCl was dissolved in the solution until saturation was reached and the solution was extracted with ethyl acetate (EtOAc) (2×30 mL). The combined organic phase was washed with brine and dried over Na$_2$SO$_4$. Removal of the solvent gave the free amine as colorless crystals: 999 mg (64%).

To a solution of this amine (999 mg, 8.0 mmol) in EtOH (10 mL) was added p-toluenesulfonic acid H$_2$O (1.52 g, 8.0 mmol) in EtOH (10 mL). The reaction mixture was stirred for 30 min. at room temperature. The resulting clear solution was concentrated and the slightly yellowish solid was dried: 2.09 g (88%).

In the following Examples, various compositions of polyolefins and clarifying and/or nucleating additives were prepared. The compositions were evaluated by measuring crystallization properties using Differential Scanning Calorimetry (DSC) according to ASTM D-794-85, run at a rate of 20° C./min and by measuring haze using ASTM D 1003-92. All percentages are in wt % unless otherwise stated.

Formulation Example

A composition of the invention was made in a Haake Rheocord 90 melt mixer by combining 0.950 g of the compound of Preparative Example 1 with 190 g of Quantum™ 8310 GO, available from Quantum Chemical Co, Cincinnati, Ohio. The polymer was a random copolymer with 3% ethylene and contained an additive package of 300 ppm Irganox™ 1010 antioxidant, 500 ppm Ultranox™ 626 antioxidant and 1000 ppm calcium stearate.

The composition was mixed for three minutes at 200° C. and 15 rpm and for an additional five minutes at 170° C. at 50 rpm with a one minute transition period between the two sets of conditions.

The crystallization parameters of the composition were determined by DSC. A sample was heated to 200° C., held for 10 minutes, and cooled at a rate of 20° C. per minute to about 40° C. Crystallization temperature at onset and peak temperature were recorded.

To determine clarification ability of the composition, a compression molded haze plaque was prepared by heating 6.5–7 g of the composition to 200° C. for three minutes on a Carver hotpress. The sample was then pressed to (10,000 psi) with a 0.5 mm spacer for four minutes. The plaque was then water cooled to 20–25° C. Percent haze was then measured on a BYK Gardener XL-211 Hazegard System to determine the haze.

Similar compositions were prepared from olefin and the compounds of Preparative Examples 2 through 5.

Control Example

In the Control Example, a compression molded plaque was made in a manner similar to that described in the Formulation Example except that no nucleating or clarifying agent was used. The % haze of the control material was determined by preparing a plaque using a Cincinnati Milacron 50 ACT-D injection molding machine. The machine operated at 230° C. and the mold was maintained at 32° C. After about 30 seconds, the 1.2 mm thick plaque was ejected from the mold and evaluated as above.

The performance of the modifying agents was evaluated using the procedures described above. The results are found in Table 1.

TABLE 1

Ammonium Sulfonates as Nucleators/Clarifiers

| Entry | Additive | Additive Conc. (% w/w) | Cryst. Temp. (DSC onset) [° C.] | Cryst. Temp. (DSC peak max) [° C.] | % Haze |
|---|---|---|---|---|---|
| A | none | — | 97.1 | 89.8 | 55 |
| B | [structure] | 0.5 | 110.5 | 105.7 | 54.6 |
| C | [structure] | 0.5 | 104.6 | 93.1 | 54.0 |
| D | [structure] | 0.5 | 107.7 | 101.8 | 36.0 |
| E | [structure] | 0.5 | 101.8 | 94.7 | 60.0 |
| F | [structure] | 0.5 | 110.4 | 106.0 | 59.0 |

The foregoing specification and examples provide a complete description of the invention. However, because many variations are possible without departing from the spirit and scope of the invention, the invention resides solely in the claims which follow.

We claim:
1. A composition comprising a polyolefin and, in an amount effective to act as a nucleating or clarifying agent, a modifying agent, said agent comprising a sulfonic acid salt of a compound of formula (I):

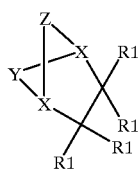
(I)

wherein each X is independently NH$^+$, NH$_2{}^+$, CH or CH$_2$, with at least one X being NH$^+$ or NH$_2{}^\pm$;
Y is C$_{1-18}$ alkylene,
C$_{2-18}$ alkenylene,
C$_{3-18}$ cycloalkylene,
C$_{4-18}$ cycloalkenylene, or
C$_{3-18}$ arylene;
Z is absent or is C$_{1-18}$ alkylene,
C$_{2-18}$ alkenylene,
C$_{3-18}$ cycloalkylene,
C$_{4-18}$ cycloalkenylene, or
C$_{3-18}$ arylene;
and
each is R1 is independently —H or
C$_{1-18}$ alkyl, or
the R1 groups on the same carbon atom combine to form an oxo group.

2. The composition of claim 1, wherein X is NH$^+$.
3. The composition of claim 1, wherein Y is C$_{1-18}$ alkylene.
4. The composition of claim 1, wherein Z is C$_{1-18}$ alkylene.
5. The composition of claim 1, wherein Z is absent and each X is NH$_2{}^+$.
6. The composition of claim 1, wherein the sulfonic acid is a compound of the general formula:

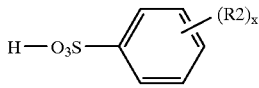

wherein each R2 is independently C$_{1-18}$ alkyl and x is 0–5.
7. The composition of claim 1, wherein the sulfonic acid is a compound of the formula R—SO$_3$H, wherein R is C$_{1-18}$ alkyl or C$_{1-18}$ fluoroalkyl.
8. The composition of claim 1, wherein the sulfonic acid is a compound of formula:

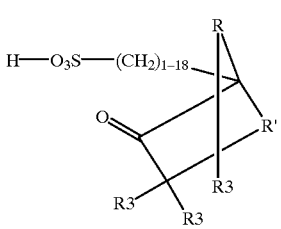

wherein R and R' are independently selected from C$_{1-18}$ alkylene and each R3 is independently H or C$_{1-18}$ alkyl.

9. The composition of claim 1, wherein the sulfonic acid is a compound of formula:

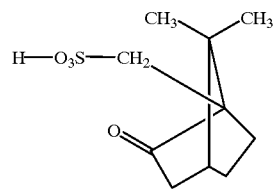

10. The composition of claim 1, wherein the modifying agent has the following formula:

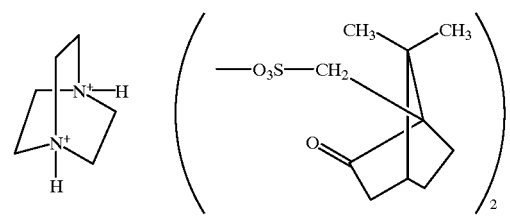

11. The composition of claim 1, wherein the polyolefin comprises polypropylene.
12. The composition of claim 1, wherein the modifying agent is present in the composition in amount in the range from about 0.001 to 1 wt.-% based on the total composition weight.
13. The composition of claim 1, wherein the modifying agent is present the composition in an amount in the range from about 0.15 to 0.7 wt-% based on the total composition weight.
14. A method of enhancing the physical properties of a polyolefin, the method comprising adding, in an amount effective to act as a nucleating of clarifying agent, a modifying agent that comprises a sulfonic acid salt of a compound of formula (I);

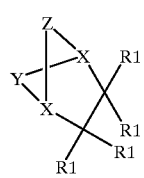
(I)

wherein each X is independently NH$^+$, NH$_2{}^+$, CH or CH$_2$, with at least one X being NH$^+$ or NH$_2{}^\pm$;
Y is C$_{1-18}$ alkylene,
C$_{2-18}$ alkenylene,
C$_{3-18}$ cycloalkylene,
C$_{4-18}$ cycloaikenylene, or
C$_{3-18}$ arylene;
Z is absent or is C$_{1-18}$ alkylene,
C$_{2-18}$ alkenylene,
C$_{3-18}$ cydoalkylene,
C$_{4-18}$ cycloalkenylene, or
C$_{3-18}$ arylene;
and
each R1 is independently H or
C$_{1-18}$ alkyl, or
the R1 groups on the same carbon atom combine to form an oxo group, to the polyolefin.

15. The method of claim 14, wherein X is NH⁺.

16. The method of claim 14, wherein Y is $C_{1-18}$ alkylene.

17. The method of claim 14, wherein Z is $C_{1-18}$ alkylene.

18. The method of claim 14, wherein Z is absent and each X is $NH_2^+$.

19. The method of claim 14, wherein the sulfonic acid formula is a compound of formula:

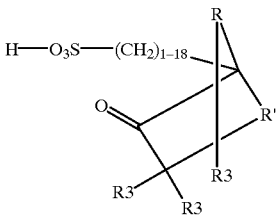

wherein R and R' are independently selected from $C_{1-18}$ alkylene and each R3 is independently H or $C_{1-18}$ alkyl.

20. The method of claim 14, wherein the sulfonic acid is a compound of the general formula:

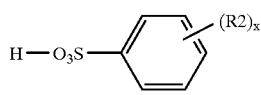

wherein R2 is $C_{1-18}$ alkyl and x is 0–5.

21. The method of claim 14, wherein the sulfonic acid is a compound of the formula R—$SO_3H$, wherein R is $C_{1-18}$ alkyl or $C_{1-18}$ fluoroalkyl.

22. The method of claim 14, wherein the sulfonic acid is a compound of formula:

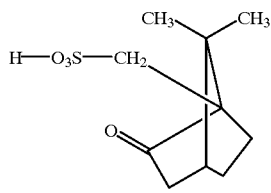

23. The method of claim 14, wherein the polyolefin comprises polypropylene.

24. The method of claim 14, wherein the modifying agent is present in the composition in amount in the range from about 0.001 to 1 wt-% based on the total composition weight.

25. The method of claim 14, wherein the modifying agent is present in the composition in an amount in the range from about 0.15 to 0.7 wt-% based on the total composition weight.

26. The method of claim 14, wherein the modifying agent has the following formula:

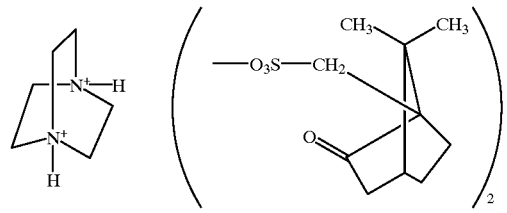

27. The comnposition of claim 1 wherein a sulfonic acid counterion is ionically associated with the NH⁺ or $NH_2^+$.

28. The method of claim 1 wherein a sulfonic acid counterion is ionically associated with the NH⁺ or $NH_2^+$.

* * * * *